Dec. 21, 1954

A. N. STANTON 2,697,594

ACCELERATION DETECTING DEVICE

Filed Feb. 17, 1951

INVENTOR.
AUSTIN N. STANTON
BY *Walter J. Jagmin*
ATTORNEY

Dec. 21, 1954     A. N. STANTON     2,697,594
ACCELERATION DETECTING DEVICE
Filed Feb. 17, 1951     2 Sheets-Sheet 2

INVENTOR.
AUSTIN N. STANTON
BY Walter J. Jagym
ATTORNEY

United States Patent Office 2,697,594
Patented Dec. 21, 1954

2,697,594

ACCELERATION DETECTING DEVICE

Austin N. Stanton, Garland, Tex.

Application February 17, 1951, Serial No. 211,539

12 Claims. (Cl. 264—1)

This invention relates to acceleration detection devices and more particularly to such devices for producing a signal which varies in accordance with the acceleration of a body.

In many applications, it is desirable to produce variations in an electric quantity, such as a voltage, which varies in accordance with the acceleration of a body. Devices for producing such variations in a voltage or other electrical quantity must be capable of giving a continuous, very accurate indication of the acceleration of the body. The signal may be fed into any suitable recorder to make a permanent record of the accelerations to which the body is subjected or may be employed in any desired electrical circuit in which a signal is needed which varies in accordance with the acceleration of the body. Such devices must be of simple, rugged construction, and easy to manufacture and to maintain in serviceable condition.

Accordingly, it is an object of the invention to provide a new and improved acceleration detection device.

It is another object of the invention to provide a new and improved acceleration detection device for producing variations in an electrical quantity which vary in accordance with the variations in the acceleration to which the device is subjected.

It is another object of the invention to provide a new and improved acceleration detection device which provides a continuous signal which varies in accordance with the acceleration to which the device is subjected.

Briefly stated, in one embodiment of the invention a coil is movably mounted by means of a resilient diaphragm on a magnetic core within a magnetic field of the core. One plate of a capacitor is secured to the coil and moves therewith toward and away from the other plate of the capacitor which is rigidly secured to the core. The variations in the capacitance of the capacitor caused by movement of one plate relative to the other are employed to change the frequency of the output of an oscillator. The output of the oscillator is fed to a frequency discriminating circuit which produces a potential which varies in accordance with the changes in the capacitance. This potential is impressed on the control grid of an electric discharge means which controls the current in the movable coil. The electric discharge means acts as an amplifier in order that small variations in the position of the movable plate of the capacitor will result in large changes in the current in the movable coil. The device is so mounted on the object whose acceleration is to be investigated that the changes in force created by the reaction of the current in the coil and the magnetic field caused by variations in the current in the coil, which in turn are caused by displacements of the coil and movable plate relative to the stationary plate due to accelerations of the body, will cause the coil to remain almost stationary in a predetermined position relative to the magnetic core. The current in the coil circuit therefore varies in accordance with the acceleration of the body and the potential across a resistance in series with the coil can therefore be employed as the signal which varies in accordance with the acceleration.

In another embodiment of the invention a magnetic core is secured to the movable coil and moves into and out of a stationary coil. The inductance of the stationary coil varies in accordance with the position of the movable core and is employed in a manner similar to that in which the variable capacitance of the above described embodiment was employed to vary the frequency of the output of the oscillator.

In still another embodiment of the invention the changes in the mutual inductance between a pair of concentric air-core coils mounted on the diaphragm which is caused by changes in the distances of the coils from a nonmagnetic metal plate are employed to change the current in the coil.

For a better understanding of the invention, reference may be had to the following drawing taken in connection with the accompanying drawing and its scope will be pointed out in the appended claims.

Figure 1:
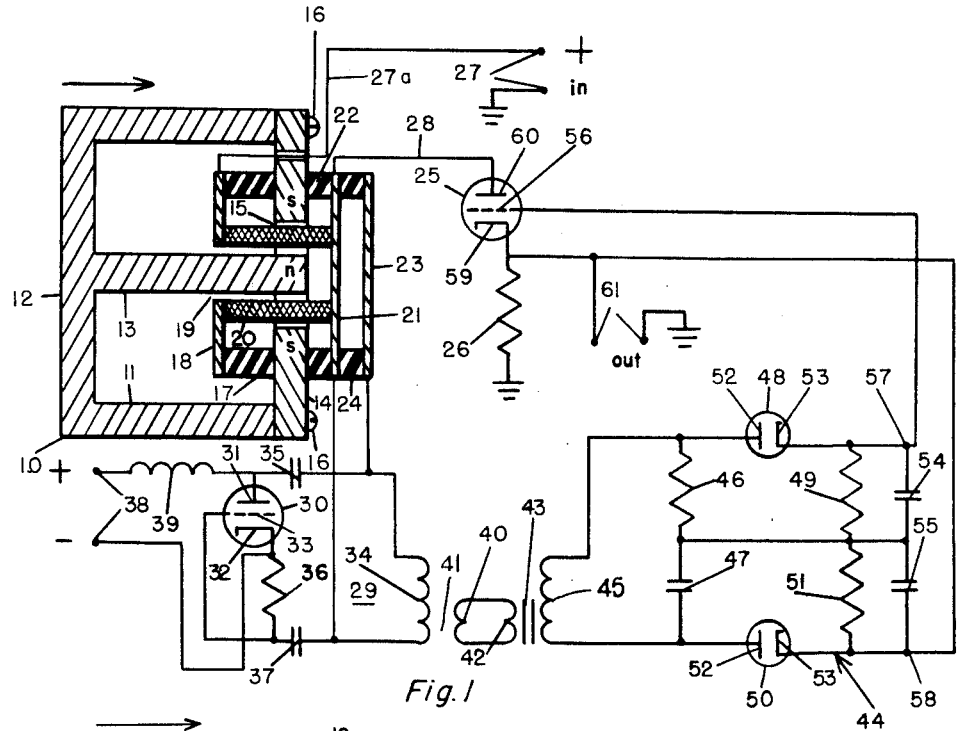
Figure 1 is a diagrammatic illustration, with some parts shown in section, of one embodiment of the invention.

Referring now to Figure 1 of the drawing the device for detecting acceleration comprises a magnetic core structure 10 having a cylindrical wall 11, an end wall 12 and a control leg 13 extending from the back wall 12 and concentric with the cylindrical wall 11. A diskshaped pole piece 14 of magnetic material and provided with a central aperture 15 is secured to the end of the cylindrical wall 11 opposite the end wall 12 by means of screws 16 or in any other suitable manner. An annular spacer 17 of nonconductive material is rigidly secured to the inner side of pole piece 14 and supports a resilient diaphragm 18 which is also provided with a central aperture 19. The central leg 13 extends through the apertures 15 and 19 in the pole piece 14 and the diaphragm 18.

The diaphragm 18 is secured to and supports one end of a movable coil 20 whose other end is secured to and supported by an outer diaphragm 21. The outer diaphragm is mounted on an annular spacer 22 of nonconductive material which in turn is mounted on the outer side of pole piece 14. The diaphragms 18 and 21 have been illustrated as being flat disks for the sake of simplicity but it will be obvious that other conventional resilient diaphragms provided with corrugations or apertures to increase flexibility may be employed if so desired. The coil 20 is disposed in the annular aperture between the leg 13 and the pole piece 14. Since the core structure 12 is permanently magnetized, the coil 20 is disposed in a magnetic field and will tend to move in a direction parallel to leg 13 when it is energized by a direct current.

A plate 23 is secured in spaced relation to the outer diaphragm 21 by means of an annular spacer 24 of nonconductive material which is mounted on diaphragm 21. The spacers 17, 22 and 24 and diaphragms 18 and 21, pole piece 14 and plate 23 may be rigidly secured to one another by means of an adhesive or in any other suitable manner.

The amount of current flowing in the coil 20 is controlled by an electric discharge means 25 which is connected in series with the coil 20 and a resistance 26 across a direct current supply circuit 27. The terminals of coil 20 are connected to the diaphragms 18 and 21 in the conventional manner and the current is therefore supplied to the coil 20 through conductor 27, diaphragms 18 and 21, conductor 28, the anode-cathode circuit of electric discharge means 25, resistance 26 and ground.

In order to vary the current in the coil 20 in accordance with the position of the diaphragm 21 relative to the plate 23, the variations in the capacity between the diaphragm 21 and the plate 23 are used to vary the frequency of oscillation of conventional oscillator 29. The oscillator 29 includes an electric discharge device 30 having an anode 31, a cathode 32 and a control grid 33. The anode 31 is connected to one side of a primary winding 34 through a capacitor 35 while the cathode 32 is connected to the other side of the primary winding through a condenser resistance 36 and a capacitance 37. The control grid 33 is connected to the common connection of resistance 36 and capacitor 37. The oscillator 29 is energized from a direct current supply circuit 38 of a suitable voltage. The anode 31 is connected to one side of the supply circuit 38 through a radio frequency choke 39 while the cathode 32 is connected directly to the other side of the supply circuit 38. The secondary winding 40 of the air-core transformer 41 is connected to the primary winding 42 of an iron core transformer 43 in order that the conventional frequency discriminator circuit 44 connected across the secondary winding 45 may be supplied with an alternating current of the same frequency as the output of the oscillator 29.

The frequency discriminator circuit 44 is of the conventional type which delivers a potential which varies in accordance with the frequency of the alternating current in the secondary winding 45. The frequency discriminator circuit comprises a resistance 46 and a capacitance 47 connected in series across the secondary winding 45. An unidirectionally conducting device such as an electric discharge means 48 and resistance 49 are connected in series relation across the resistance 46. A similar unidirectionally conducting device, electric discharge means 50, and a resistance 51 are connected in series across the capacitance 47. Electric discharge means 48 and 50 act as rectifiers and each is provided with an anode 52 and a cathode 53. Capacitors 54 and 55 are connected across resistances 49 and 51, respectively, to smooth out the pulsating direct current transmitted to resistances 49 and 51 by electric discharge means 48 and 50. The voltage appearing across both resistances 49 and 51 is impressed on the control grid 56 of the electric discharge means 25 since one output terminal 57 of the frequency discriminator circuit 44 is connected to the grid 56 and the other output terminal 58 is connected to the cathode 59 of the electric discharge means 25. The electric discharge means 25 also comprises an anode 60 which is connected to the coil 20 through the diaphragm 21.

In use, the magnetic core structure is rigidly attached to the body whose acceleration is to be detected. The coil 20 will be free to move back and forth in the annular gap 15 of the core since it is mounted between and on the diaphragms 18 and 21. Sufficient current is being transmitted to coil 20 to keep the coil in its normal position relative to core structure 12. If the body is now accelerated in the direction indicated by the arrow, the coil 20, since it has a definite mass, will tend to remain stationary while the magnetic core structure is moved along with the body. This causes the diaphragm 21 to move away from the metal plate 23 decreasing the capacitance between diaphragm 21 and plate 23. This change in capacitance causes the frequency of the output of the oscillator 29 to change. The change in the frequency is converted by the frequency discriminator circuit 44 into a change in the potential impressed on control grid 56. The change in the potential impressed on the control grid 56 causes such change in the amount of current flowing in coil 20 as to tend to restore coil 20 to its normal position. The restoring coil 20 will not, of course, remain immovable but if the amplification obtained in the various circuits is quite high, the coil will move only a very small distance even during extreme accelerations since the changes in the current in the restoring coil 20 will be quite large for small movements of the coil. This small degree of movement of the coil 20 ensures maximum accuracy since the forces exerted by the diaphragms 18 and 21 vary substantially linearly for small displacements. Moreover, the diaphragms are never subjected to extreme stresses and strains since their displacements are kept extremely small.

Since the current in the restoring coil 20 varies in accordance with the acceleration to which the device is subjected, the voltage drop across the resistance 26 also varies in accordance with the acceleration. The output circuit 61 is therefore connected across the resistance 26 to deliver a direct voltage which varies in accordance with the acceleration, the value of the voltage being a direct indication of the severity or value of the acceleration. If desired, an ammeter can be connected in series with the coil 20 and its reading will give a direct indication of the value of the acceleration to which the device is subjected.

Figure 2:
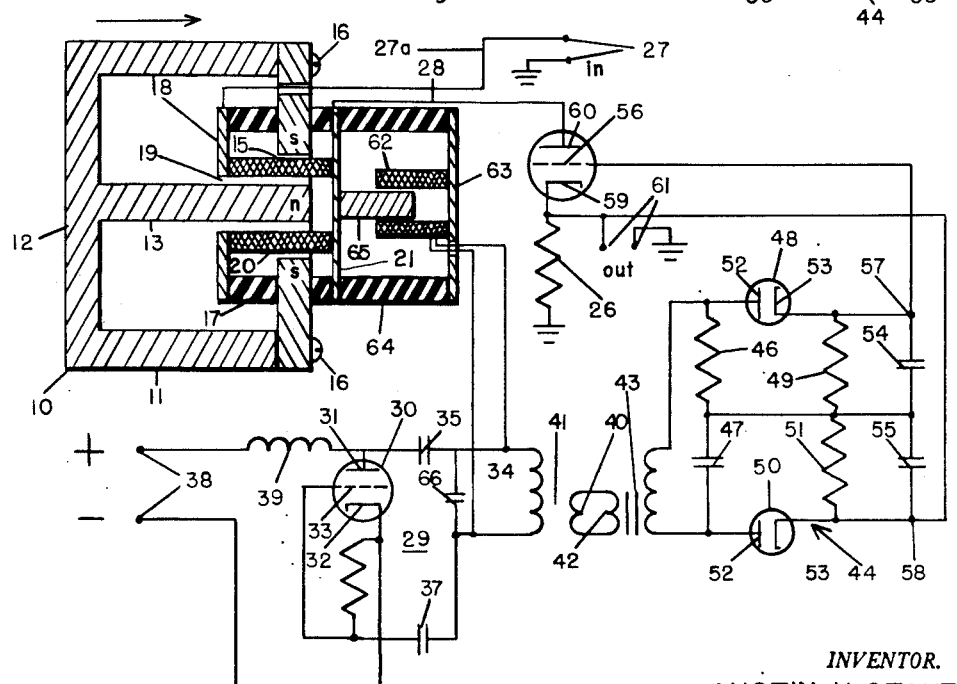
Figure 2 is a diagrammatic illustration, with some parts shown in section, of another embodiment of the invention; and, Figure 3 is a diagrammatic illustration, with some parts shown in section, of still another embodiment of the invention.

In another embodiment of the invention, Figure 2, the inductance of a coil 62 rigidly mounted on the core structure 12 by means of a plate 63 and a spacer 64 is varied in accordance with acceleration by means of the magnetic body or slug 65 which is rigidly secured to the diaphragm 21. It will be apparent that as the slug 65 moves into or out of the coil 62, the inductance of the coil 62 will vary. These variations in the inductance of coil 62 cause changes in the output frequency of the oscillator 29 since it is connected across the capacitor 66 which, in this embodiment of the invention, is connected across the primary winding 34 of the transformer 41.

Figure 3:
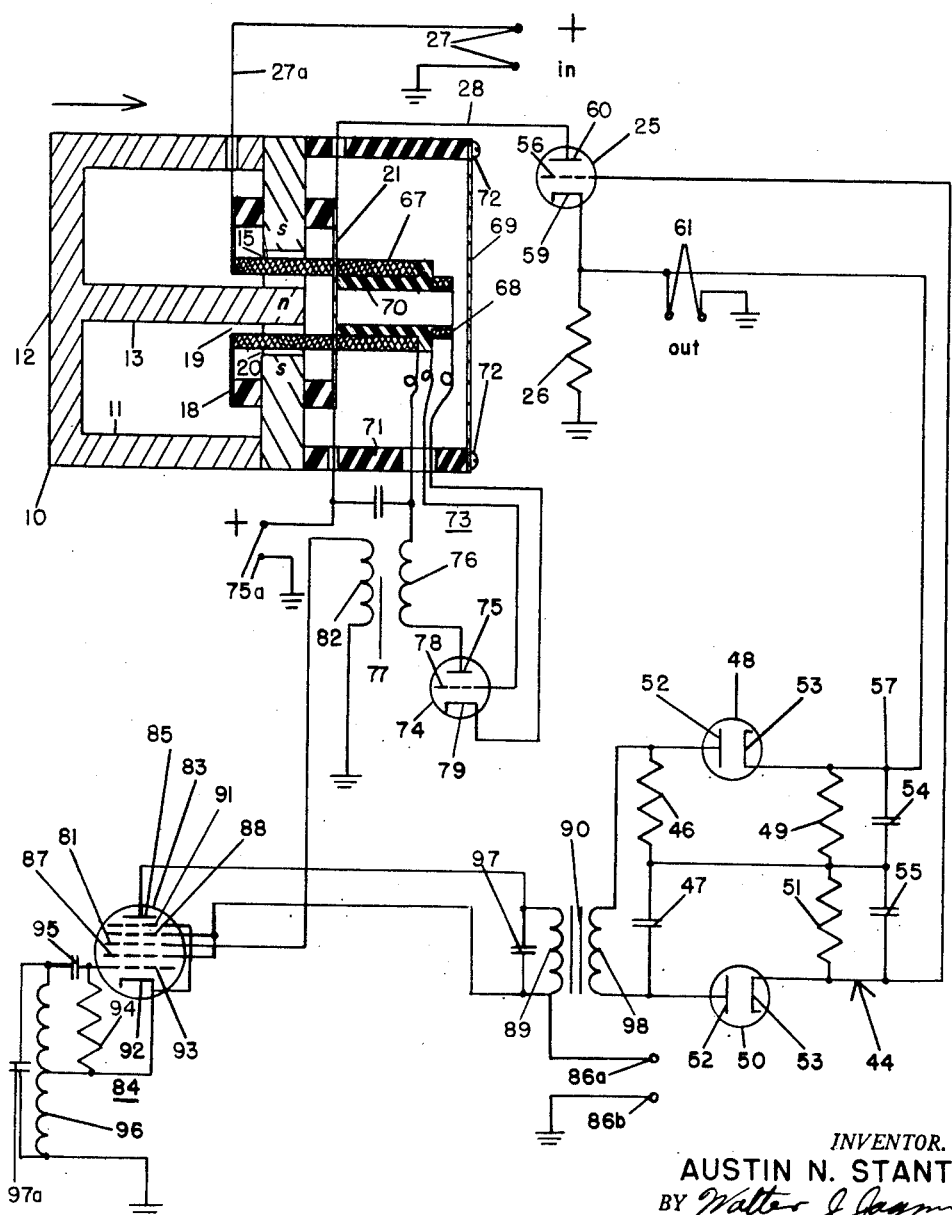

In the embodiment of the invention illustrated in Figure 3, the variation in the mutual inductance between two concentric air-core coils 67 and 68 which is caused by changes in the distance of the coils 67 and 68 from a non-magnetic metal plate 69 is employed to vary the current in the electric discharge means 25. The "shielding" action of the plate varies as its distance from the coils to vary the mutual inductance between the two coils. The coils 67 and 68 are mounted on a non-conductive bobbin 70 which is rigidly secured to the diaphragm 21, and the metal plate 69 is immovably mounted on the magnetic core structure by means of an annular spacer 71 and screws 72. The primary coil 67 is energized by current from an oscillator 73 which comprises an electric discharge means 74 having an anode 75 connected to one side of a direct current supply circuit 75a through the primary winding 76 of an air-core transformer 77 and the coil 67. The potential induced in the secondary coil 68 is impressed on the control grid 78 of the electric discharge means since opposite sides of the coil 68 are connected to the control grid 78 and the cathode 79, respectively. A capacitor 80 is connected across the primary coil 67.

It will be apparent that as the coils 67 and 68 move relative to the plate 69 during accelerations, the coupling between the coils 67 and 68 will change and cause a change in the frequency of oscillation of the oscillator 73.

The output of oscillator 73 is fed to signal grid 81, which is connected to the secondary winding 82 of the transformer 77, of a pentagrid electric discharge means 83 of a second conventional oscillator 84 in order to obtain a beat frequency which varies in accordance with the position of the coils 67 and 68 relative to the plate 69.

The electric discharge means 83 comprises an anode 85 connected to one side 86a of a direct current supply circuit through the primary winding 89 of a transformer 90, an oscillator plate 87 and a shield grid 88 connected to the side 86a of the supply circuit, a shield grid 91 connected to a cathode 92, and an oscillator grid 93. The oscillator grid 93 is connected to the cathode 92 through a resistance 94 and through a capacitor 95 and the upper portion of an inductive winding 96. The side of the inductive winding not connected to the oscillator grid 93 is connected to the side 86b of the supply circuit through ground. A capacitor 97a is connected across the inductive winding 96. A capacitor 97 is connected across the primary winding 89.

The conventional oscillator 84 has a fixed frequency of vibration, which appears across its anode 85, cathode 92 circuit, determined by the values of the capacitance 95, the resistance 94 and the inductance 96. The frequency of oscillation appearing across the oscillator plate 93 and cathode 92 circuit, however, varies with the variable frequency impressed on the signal grid 81. This beat frequency of the fixed frequency and the frequency impressed on the signal grid appears across the primary winding 89. The secondary winding 98 energizes the frequency discriminator circuit 44 to cause the conductivity of electric discharge means 25 to change in accordance with the position of the coils 67 and 68 in relation to plate 69. The current in the restoring coil 20 is so varied as to tend to maintain the coil 20 in its normal position. The voltage drop across the resistance 26, therefore, will vary in accordance with the variation in the current flowing in the restoring coil 20 and therefore with the acceleration to which the device is subjected. Transformer 90 as well as the transformers 43 of Figures 1 and 2 are preferably of the powdered iron core type.

Among the chief advantages of the above illustrated acceleration detection devices is the constrainment of the motion of the inertance or mass, which comprises restoring coil 20, to directions parallel to the central axis of the diaphragms 18 and 21, the diaphragms being very stiff in all other directions; the simplicity of construction of the device, the absence of any bearings which could introduce errors due to wear, and the extremely small displacements to which the diaphragms 18 and 21 are subjected.

It will be apparent that various changes and modifications can be made in the illustrated embodiments of this invention and it is intended, therefore, in the appended claims to cover all such changes and modifications as fall within the true spirit and scope of this invention.

What I claim as new and desire to secure by Letters Patent of the United States is:

1. In an acceleration detecting device: a magnetic core structure providing an air gap in a magnetic flux path; a coil having a central longitudinal axis resiliently mounted on said structure for movement in said air gap in accordance with acceleration parallel to said axis; a second coil rigidly mounted on said structure and having a central axis concentric with said first mentioned axis; a mass of magnetic material mounted for movement with said first mentioned coil parallel to said first mentioned axis and having one end disposed in said second coil, the inductance of said second coil varying in accordance with the position of said mass; an oscillator responsive to variations in said inductance for producing an alternating current output whose frequency varies in accordance with said inductance; a frequency discriminating circuit for producing a potential which varies in accordance with the frequency of the alternating current output of said oscillator; and means responsive to said potential for variably energizing said first mentioned coil with direct current to maintain said coil in substantially normal position in said air gap during accelerations of said device.

2. In an acceleration detecting device: a magnetic core structure providing an air gap in a magnetic flux path; a resilient diaphragm mounted on said structure; a coil having a central longitudinal axis mounted on said diaphragm for movement in said air gap in accordance with acceleration parallel to said axis, said diaphragm lying in a plane perpendicular to said axis; a plate rigidly mounted on said structure adjacent and parallel to said diaphragm, the spacing between said diaphragm and said plate varying in accordance with the acceleration to which the device is subjected to vary the capacity between said plates; means operatively associated with said diaphragm and said plate and responsive to the capacity between them for variable energizing said coil with direct current to maintain said coil in substantially normal position in said air gap during accelerations of said device, the amount of current in said coil being a measure of the acceleration to which said device is subjected.

3. In an acceleration detecting device: a magnetic core structure providing an air gap in a magnetic flux path; a resilient diaphragm mounted on said structure; a coil having a central longitudinal axis mounted on said diaphragm for movement in said air gap in accordance with acceleration parallel to said axis, said diaphragm lying in a plane perpendicular to said axis; a plate rigidly mounted on said structure adjacent and parallel to said diaphragm, the spacing between said diaphragm and said plate varying in accordance with the acceleration to which the device is subjected to vary the capacity between said plates; an oscillator responsive to variations in said capacity for producing an alternating current output whose frequency varies in accordance with said inductance; a frequency discriminating circuit for producing a potential which varies in accordance with the frequency of the alternating current output of said oscillator; and means responsive to said potential for variably energizing said coil with direct current to maintain said coil in substantially normal position in said air gap during accelerations of said device, the amount of current in said coil being a measure of the acceleration to which said device is subjected.

4. In an acceleration detecting device: a magnetic core structure providing an air gap in a magnetic flux path; a resilient diaphragm mounted on said structure; a coil having a central longitudinal axis mounted on said diaphragm for movement in said air gap in accordance with acceleration parallel to said axis, said diaphragm lying in a plane perpendicular to said axis; a plate rigidly mounted on said structure adjacent and parallel to said diaphragm, the spacing between said diaphragm and said plate varying in accordance with the acceleration to which the device is subjected to vary the capacity between said plates; an oscillator responsive to variations in said capacity for producing an alternating current output whose frequency varies in accordance with said inductance; a frequency discriminating circuit for producing a potential which varies in accordance with the frequency of the alternating current output of said oscillator; an electric discharge means connected in series with said coil across a source of direct current and having a control grid, said potential being impressed on said control grid to vary the conductivity of said electric discharge means in accordance with the acceleration to which said device is subjected to maintain said coil in substantially normal position in said air gap during accelerations of said device, the amount of current in said coil being a measure of the acceleration to which said device is subjected.

5. In an acceleration detecting device: a magnetic core structure providing an air gap in a magnetic flux path; a coil having a central longitudinal axis resiliently mounted on said structure for movement in said air gap in accordance with acceleration parallel to said axis; a second coil rigidly mounted on said structure and having a central axis concentric with said first mentioned axis; a mass of magnetic material mounted for movement with said first mentioned coil parallel to said first mentioned axis and having one end disposed in said second coil, the inductance of said second coil varying in accordance with the position of said mass; an oscillator responsive to variations in said inductance for producing an alternating current output whose frequency varies in accordance with said inductance; a frequency discriminating circuit for producing a potential which varies in accordance with the frequency of the alternating current output of said oscillator; an electric discharge means connected in series with said first mentioned coil across a source of direct current and having a control grid, said potential being impressed on said control grid to vary the conductivity of said electric discharge means in accordance with the acceleration to which said device is subjected to maintain said first mentioned coil in substantially normal position in said air gap during accelerations of said device, the amount of current in said coil being a measure of the acceleration to which said device is subjected.

6. In an acceleration detecting device: a magnetic core structure providing an air gap in a magnetic flux path; a restoring coil having a central longitudinal axis mounted on said structure for movement in said air gap in accordance with acceleration parallel to said axis; a plate rigidly mounted on said structure; a pair of coils mounted on said structure for movement with said restoring coil parallel to said axis and toward and away from said plate, the mutual inductance between said coils varying as their distance from said plate; and oscillator responsive to the mutual inductance between said coils for providing an alternating current output whose frequency varies in accordance with said mutual inductance; a frequency discriminating circuit for providing a potential which varies in accordance with the frequency of the alternating current output of said oscillator; and means responsive to said potential for variably energizing said coil with direct current to maintain said coil in substantially normal position in said air gap during accelerations of said device, the amount of current in said coil being a measure of the acceleration to which said device is subjected.

7. In an acceleration detecting device: a magnetic core structure providing an air gap in a magnetic flux path; a restoring coil having a central longitudinal axis mounted on said structure for movement in said air gap in accordance with acceleration to said axis; a plate rigidly mounted on said structure; a pair of coils mounted on said structure for movement with said restoring coil parallel to said axis and toward and away from said plate, the mutual inductance between said coils varying as their distance from said plate; an oscillator responsive to the mutual inductance between said coils for providing an alternating current output whose frequency varies in accordance with said mutual inductance; a frequency discriminating circuit for providing a potential which varies in accordance with the frequency of the alternating current output of said oscillator; an electric discharge means connected in series with said coil across a source of direct current and having a control grid, said potential being impressed on said control grid to vary the conductivity of said electric discharge means in accordance with the acceleration to which said device is subjected.

8. In an acceleration detection device: a magnetic structure providing an air gap in a magnetic flux path; a coil resiliently mounted for movement in said air gap in accordance with acceleration; means mounted for movement with said coil; a fixed means rigidly mounted on said structure in spaced relation to said movable means, said fixed and movable means providing a variable electrical value upon variable space therebetween; an oscillator responsive to variations in said electrical value for providing an alternating current output whose frequency varies in accordance with said electrical value; a frequency discriminating circuit for providing a potential which varies in accordance with the frequency of the alternating current output of said oscillator; and means responsive to said potential for variably energizing said coil with direct current to maintain said coil in substantially normal position in said air gap during acceleration of said device, the amount of current in said coil being a measure of the acceleration to which said device is subjected.

9. In an acceleration detection device: a magnetic structure providing an air gap in a magnetic flux path; a coil resiliently mounted for movement in said air gap in accordance with acceleration; means mounted for movement with said coil; a fixed means rigidly mounted on said structure in spaced relation to said movable means, said fixed and movable means providing a variable electrical value upon variable space therebetween; an oscillator responsive to variations in said electrical value for providing an alternating current output whose frequency varies in accordance with said electrical value; a frequency discriminating circuit for providing a potential which varies in accordance with the frequency of the alternating current output of said oscillator; an electric discharge means connected in series with said coil across a source of direct current and having a control grid, said potential being impressed on said control grid to vary the conductivity of said electric discharge means in accordance with the accelerations to which said device is subjected to maintain said coil in substantially normal position in said air gap during accelerations of said device, the amount of current in said coil being a measure of the acceleration to which said device is subjected.

10. In an acceleration detection device; a magnetic core structure providing an air gap in a magnetic flux path; a resilient diaphragm mounted on said structure; a restoring coil having a central longitudinal axis mounted on said diaphragm for movement in said air gap in accordance with acceleration parallel to said axis, said diaphragm lying in a plane perpendicular to said axis; a plate rigidly mounted on said structure adjacent and parallel to said diaphragm; the spacing between said diaphragm and said plate varying in accordance with the acceleration to which said device is subjected; means operatively associated with said diaphragm and said plate and responsive to the spacing between said plate and said diaphragm for providing a potential which varies in accordance with said spacing; and means responsive to said potential for variably energizing said coil with direct current to maintain said coil in substantially normal position in said air gap during accelerations of said device, the amount of current in said coil being a measure of the acceleration to which said device is subjected.

11. The device of claim 10 in which said means for providing a potential which varies in accordance with said spacing comprises a pair of coils movable with said restoring coil parallel to said axis and toward and away from said plate, the mutual inductance between said coils varying as their distance from said plate, and means responsive to the mutual inductance between said pair of coils for producing said potential, said potential varying with said mutual inductance.

12. The device of claim 10 in which said means for producing a potential which varies in accordance with said spacing comprises a pair of elements, one of said elements being mounted on said diaphragm and the other of said elements being mounted on said plate, one of said elements being a second coil having a central axis concentric with said first mentioned axis, the other of said elements being a magnetic means having one end disposed in said second coil, one of said elements being movable with respect to the other, the inductance of said second coil varying in accordance with the relative positions of said elements, and means responsive to the inductance of said second coil for producing said potential, said potential varying with said inductance.

References Cited in the file of this patent

UNITED STATES PATENTS

| Number | Name | Date |
|---|---|---|
| 1,826,024 | Roller | Oct. 6, 1931 |
| 2,193,910 | Wilson | Mar. 19, 1940 |
| 2,210,970 | Bonell | Aug. 13, 1940 |
| 2,332,994 | Draper | Oct. 26, 1943 |
| 2,371,040 | Fisher | Mar. 6, 1945 |
| 2,498,118 | Weiss | Feb. 21, 1950 |
| 2,591,921 | Cosgriff et al. | Apr. 8, 1952 |